: 3,730,850
Patented May 1, 1973

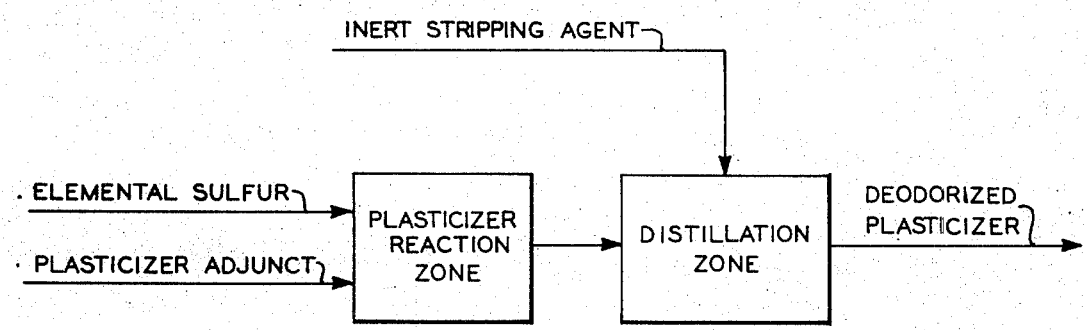

3,730,850
REMOVAL OF ODOR-CAUSING MATERIALS FROM SULPHUR-CONTAINING PLASTICIZERS BY DISTILLATION WITH A HYDROCARBON
Rector P. Louthan, Bartlesville, Okla., assignor to Phillips Petroleum Company
Filed Apr. 17, 1970, Ser. No. 29,634
Int. Cl. B01d 3/34; C07c 149/02
U.S. Cl. 203—52                                   10 Claims

ABSTRACT OF THE DISCLOSURE

Objectionable odor is substantially removed from plasticized sulfur-containing compositions by a process comprising admixing certain high-boiling inert solvents with partially-reacted plasticizer and stripping out the high boiling inert solvent under reduced pressure while completing the plasticizer preparation.

---

The present invention relates to chemical processes. Particularly, the invention relates to removal of odor-causing materials from organic compositions, especially sulfur-containing organic compositions. The invention is especially concerned with reducing undesirable odor of sulfur-containing coating compositions.

Blending elemental sulfur with a suitable plasticizing material, such as an organic material which reacts at least in part with the sulfur, produces plasticized compositions having a variety of uses. The use of such compositions as road-marking materials, coatings for buildings, and other uses requiring durability is steadily increasing. Unfortunately, such compositions quite often give off a characteristic objectionable odor during and immediately following application which is both aggravated and prolonged by hot weather. This objectionable odor limits the use of these desirable plasticized compositions, particularly in more densely populated areas.

The present invention contemplates the removal of odor-causing bodies from plasticized sulfur-based compositions. It has been discovered that such plasticized sulfur-based compositions can be substantially deodorized by a process comprising stripping said plasticizer under a reduced pressure in the presence of certain high-boiling inert solvents.

In accordance with the invention, sulfurized plasticizers having an objectionable odor are essentially deodorized by the process comprising admixing certain high-boiling inert solvents with a solution of sulfurized plasticizer and distilling the mixture under reduced pressure at a temperature in the range of 300° F. to 750° F. to render the plasticizer substantially free of odor-causing contaminant. Preferably, the high-boiling solvent is admixed with a solution of partially reacted sulfurized plasticizer, i.e., a plasticizer reaction mixture comprising sulfurized plasticizer, unreacted sulfur and unreacted polythiol. According to this embodiment, at least a portion of the elemental sulfur and polythiol continues to react to form additional sulfurized plasticizer while odor-forming bodies are simultaneously stripped from the reaction mixture together with the inert solvent. According to this preferred embodiment, the high-boiling solvent or stripping agent is added to the reaction vessel a finite time after the vigorous evolution of hydrogen sulfide ceases but while some hydrogen sulfide is still being evolved at a low rate. It has been found that the optimum time for admixing the inert solvent is on the order of about three hours after the initiation of the reaction between the polythiol and the elemental sulfur.

The high boiling solvents which are useful as stripping agents for the removal of odor-causing contaminants from sulfurized plasticizers are hydrocarbon materials having an initial boiling point of 300° F. and a relatively broad boiling point range which is generally on the order of 150° F. to 450° F. Thus, such hydrocarbons will have an overall boiling range of 300° F. to 750° F., preferably 300° F. to 600° F., and at least 300° F. to 450° F. Hydrocarbons having a narrow boiling range, e.g., 300° F. to 400° F., or an initial boiling point above 350° F. to 400° F. have been found ineffective in removing odor-causing contaminants from the sulfurized plasticizers. Hydrocarbon materials which have been found to be particularly useful stripping agents include kerosene, diesel fuel, methylnaphthalene and methyldi-tert-butyl-naphthalenes. Kerosene and diesel fuel are preferred stripping agents. The inclusion with the base stripping agent of auxiliary materials such as chlorinated polyphenols and partially hydrogenated chlorinated polyphenols can improve the degree of removal of the odor-causing contaminants.

Generally, the hydrocarbon stripping agents can be added to the sulfurized plasticizer compositions in a ratio of stripping agent to plasticizer in the range of 0.25-2:1 with a preferred ratio being 1 part of stripping agent to 2 parts of sulfurized plasticizer, with the ratios being on a parts by weight basis.

The distillation is effected at reduced pressures, such as under a vacuum or in the presence of an inert vapor, e.g., steam, such that the vapor pressure of the hydrocarbon stripping agent is in the range of 1 mm. Hg to about 100 mm. Hg, preferably 1 to 20 mm. Hg. Deodorization is considered complete when the distilland overhead comprises a volume approximately equal to the volume of hydrocarbon stripping agent charged.

The plasticizers which are deodorized in accordance with the present invention comprise the reaction product of elemental sulfur and a plasticizer adjunct to provide a sulfurized plasticizer which, when admixed with elemental sulfur, provides a sulfur-based composition having adhesive and durability properties. Such plasticizer adjuncts include, for example, aryl polysulfides, alkyl polysulfides, organic polythiols, chlorinated polyphenols, wood rosin, natural rubber, butyl rubber, olive oil, organic esters, alkyd resins and the like, and combinations of these.

Particularly applicable are the sulfurized plasticizers comprising the reaction product of elemental sulfur and organic polythiols. Applicable polythiols are those having the formula $Y(SH)_n$, where $n$ is an integer selected from the group consisting of 2, 3, and 4, preferably 2 or 3, and Y is a radical having a valence of $n$ and containing 2–30, preferably 2–20, carbon atoms, each of said carbon atoms preferably having attached thereto not more than one SH group, said radical Y being selected from the group consisting of (A) radicals containing carbon and hydrogen only, (B) radicals containing carbon, hydrogen, and oxygen only, and (C) radicals containing carbon, hydrogen, and sulfur only, the sulfur being present as monosulfide linkages. Radicals containing carbon and hydrogen only include saturated aliphatic, unsaturated aliphatic, saturated cycloaliphatic, unsaturated cycloaliphatic, and aromatic radicals, and combinations thereof. Radicals containing carbon, hydrogen, and oxygen only include saturated aliphatic, unsaturated aliphatic, saturated cycloaliphatic, and unsaturated cycloaliphatic radicals and aromatic radicals, and combinations thereof, possessing hydroxy, ester, aldehydic, or ketonic substituents, or other linkages, the total number of said substituents and linkages preferably not exceeding two. Radicals containing carbon, hydrogen, and sulfur only, the sulfur being present as sulfide linkages, include saturated and unsaturated hydrocarbyl radicals in which one or more methylene groups not adjacent to the thiol groups in the molecule are replaced by monosulfide linkages, said monosulfide linkages being separated by at least one carbon atom when more than one monosulfide linkage is present, and the number of said monosulfide linkages preferably not exceeding 10. The polythiol is free from polysulfide linkages and the major portion of the sulfur remains in elemental form rather than being chemically bonded within the organic polymer molecule.

Particularly preferred as plasticizers for elemental sulfur are the materials comprising the reaction product of elemental sulfur and a trithiol or tetrathiol, preferably a trithiol, in combination with a dithiol. The use of a mixture of dithiol and trithiol or tetrathiol results in sulfurized plasticizers which, when combined with elemental sulfur, provide plasticized sulfur compositions whose properties are quite different than would be expected on the basis of the properties of compositions prepared through use of the polythiols individually.

In preparing the sulfurized plasticizers which are deodorized according to the invention, the ratio of polythiol to sulfur will usually be in the range of 3-30 parts by weight of polythiol to 100 parts by weight of sulfur, preferably in the range of 5-20 parts by weight of polythiol to 100 parts by weight of sulfur.

Although any of the polythiols can be used in combination, it is especially advantageous to employ both a dithiol and a trithiol or tetrathiol in preparing the sulfurized plasticizers. The dithiol and trithiol or tetrathiol can be employed over a wide range of ratios; however, the ratio of dithiol to trithiol or tetrathiol should usually be in the range of 1:9 to 9:1, will most often be in the range of 1:4 to 4:1, depending on the nature of the polythiols and on the properties desired in the plasticized sulfur compositions. The above-referred-to ratios are by weight.

The sulfurized plasticizers are preferably prepared in the absence of added solvent, although suitable solvents such as chloroform, carbon tetrachloride, benzene, toluene and xylene can be used. The sulfurized plasticizers are generally prepared by heating the plasticizer adjunct such as polythiol with at least a stoichiometric excess of elemental sulfur at a temperature sufficient to provide a molten reaction product, the temperature of reaction is maintained within the range of about −10° F. to 500° F., preferably 75° F. to 400° F. A reaction temperature of 300° F. to 350° F. is particularly suitable. The reaction period varies, depending on the temperature and on the nature and concentration of the compounds in the reaction system, but should be in the range of about 1 minute to about 2 days, usually being within the range of about 3 minutes to about 4 hours. The pressure need be only sufficient to maintain the polythiols and solvent, if used, substantially in the liquid phase. Hydrogen sulfide, which is evolved during the reaction, can be removed as it is formed. If a solvent is used, the solvent can be removed by volatilization upon completion of the reaction.

The deodorized sulfurized plasticizers can be formulated into sulfur-based compositions according to known methods. Thus, these treated plasticizers can be diluted with additional elemental sulfur, together with appropriate viscosity control agents, fillers, pigments and coloring agents as desired.

Plasticized sulfur marking compositions prepared using the deodorized plasticizing agents of this invention can have pigments added thereto and have sufficient whiteness and impact strength to make them ideally suitable for white marking compositions, for example, in the marking of highways, streets, roads, airport landing strips and the like. Materials such as sand, glass beads and the like can be added to impart special properties sometimes desired in such marking compositions.

Any filler can be employed in the preparation of the plasticized sulfur-containing compositions. In some instances, the fillers can also serve as extender pigments. Preferably, the filler is added to the plasticized sulfur-containing compositions. Thorough mixing of the filler with the plasticized sulfur is readily achieved by stirring at temperatures at which the plasticized sulfur is molten. Less preferably, the filler can be aded to the sulfur and/or the plasticizer prior to plasticizing of the sulfur.

Fillers suitable for use in the plasticized compositions are selected from the group consisting of silica, bentonite, China clay, titanium dioxide, barium sulfate, barium carbonate, calcium carbonate, calcium sulfate, magnesium silicate, magnesium oxide, magnesium carbonate, graphite, carbon black, glass fibers, metal powders, asbestos, wood flour, cotton floc, alpha cellulose, mica pyrophyllite, pumice, diatomite, aluminum hydrate, calcium silicate and the like.

The filler is present in the range of from about 1 to about 50 parts by weight per 100 parts by weight of plasticized sulfur.

According to a particularly preferred embodiment of the invention, a partially reacted plasticizer mixture comprising polysulfide, unreacted sulfur and unreacted polythiol is contacted with an inert hydrocarbon solvent having a boiling point above 300° F. at a temperature in the range of 325 to 750° F. that is, the polythiol and elemental sulfur are introduced into a reaction vessel maintained under conditions conducive to polymerization. Following the formation of polymerization product, but before the polymerization reaction has gone to completion, the inert hydrocarbon solvent, which has a boiling point above the polymerization reaction temperature, is introduced into contact with the partially reacted plasticizer. The reaction mixture comprising partially reacted plasticizer is distilled under reduced pressure while at the same time the polymerization reaction proceeds to completion. Generally, polymerization reactions to form the polysulfide plasticizers require on the order of about 4 hours to completion, with the highest rate occurring during the first hour. The hydrocarbon solvent is normally added after about 3 hours, and the stripping process is effected over a period of about 1 to about 8 hours, depending on the boiling point of the added hydrocarbon. Preferably, the stripping temperature is not more than 100° F. higher than the normal polymerization reaction temperature, and is preferably in the range of 300° to 375° F., particularly 300° to 350° F.

The following examples are illustrative of the invention.

EXAMPLE I

A mixture comprising 1280 grams of ethylcyclohexanedithol and 960 grams of elemental sulfur is heated for three hours at 312° F. under a nitrogen atmoshpere to produce a polysulfide plasticizer. To 450 grams of the this-formed crude sulfurized plasticizer is added 250 grams of chlorinated polyphenol (Arochlor 1232) and 200 ml. of kerosene. The mixture is charged to a distillation vessel and distilled at 300° F. and 5 mm. Hg pressure to take overhead a distillate volume of 200 ml. The material which remains in the distillation vessel is mixed with 1538 grams of molten elemental sulfur containing 200 grams of silica filler. The mixture is stirred at 250° F. for one hour to complete the preparation of a sulfur-based paint. The paint composition is applied as a roadway marking material and is found to be essentially free of undersirable objectionable odor.

A paint composition utilizing as a plasticizer the reaction product of ethylcyclohexanedithiol and elemental sulfur which is not treated in accordance with the invention is applied as a roadway marking material and is found to have an undesirable odor.

EXAMPLE II

In a similar run, the kerosene is removed by steam stripping at atmospheric pressure. A paint prepared from the thus-treated sulfurized plasticizer is found to be essentially free of undesirable objectionable odor.

I claim:

1. A process for deodorizing sulfur-containing plasticizers comprising the reaction product of elemental sulfur and a plasticizer adjunct selected from the group consisting of aryl polysulfides, alkyl polysulfides, organic thiols, chlorinated polyphenols, wood rosin, natural rubber, butyl rubber, olive oil, organic esters, alkyd resins, and mixtures thereof; said process comprising admixing with said sulfur-containing plasticizers an inert hydrocarbon solvent stripping agent having an initial boiling point in the range of 300° to 400° F. and an overall boiling range of about 150° to about 450° F. and distilling said admixture comprising sulfur-containing plasticizer and hydrocarbon solvent stripping agent at a temperature in the range of 300° F. to 750° F. at a reduced pressure to render said plasticizer substantially free of odor-causing contaminant.

2. A process according to claim 1 wherein said distillation is effected in the presence of at least one chlorinated polyphenol or partially hydrogenated chlorinated polyphenol.

3. A process according to claim 1 wherein said distillation is effected at a pressure in the range of 1 to 100 mm. Hg.

4. A process according to claim 1 wherein said plasticizer comprises the reaction product of elemental sulfur and a polythiol having the formula $Y(SH)_n$, wherein $n$ is 2, 3 or 4; Y is an organic radical containing from 2 to 30 carbon atoms and a valence of $n$ and is seelcted from the group consisting of organic radicals containing carbon and hydrogen; organic radicals containing carbon, hydrogen and oxygen; or organic radicals containing carbon, hydrogen and sulfur in the form of monosulfide linkages.

5. A process according to claim 4 wherein said hydrocarbon solvent is selected from the class consisting of diesel fuel, and kerosene.

6. A process according to claim 4 wherein said distillation is effected in the presence of at least one chlorinated polyphenol or partially hydrogenated chlorinated polyphenol.

7. A process according to claim 4 wherein said plasticizer comprises the reaction product of elemental sulfur and ethylcyclohexanedithiol.

8. A process according to claim 4 wherein said reduced pressure is in the range of 1 to 100 mm. Hg.

9. A process according to claim 8 wherein said hydrocarbon solvent is kerosene.

10. A process for the preparation of a sulfur-containing plasticizer of improved odor comprising heating a mixture comprising ethylcyclohexanedithiol and at least a stoichiometric excess of elemental sulfur at a temperature in the range of 300° to 350° F. until the evolution of hydrogen sulfide essentially ceases; admixing an inert hydrocarbon solvent stripping agent having an initial boiling point of at least 300° F. and a boiling range of 150° to 450° F. with said heated mixture; and distilling said admixture at a temperature of 300° F. to 350° F. and a pressure of 1 to 100 mm. Hg to render said plasticizer substantially free of odor-causing contaminant.

References Cited

UNITED STATES PATENTS

| | | | |
|---|---|---|---|
| 3,453,126 | 7/1969 | Greco et al. | 260—125 |
| 3,165,451 | 1/1965 | Louthan | 203—52 |
| 3,202,690 | 8/1965 | Previc | 203—91 |
| 3,421,911 | 1/1969 | Greco et al. | 260—125 |
| 3,490,998 | 1/1970 | Jones | 203—65 |
| 3,522,312 | 7/1970 | Reece | 260—608 |
| 3,591,666 | 7/1971 | Pellegrini et al. | 203—91 |

WILBUR L. BASCOMB, JR., Primary Examiner

U.S. Cl. X.R.

203—57, 91; 260—139, 608, 609 D